Figure 1:
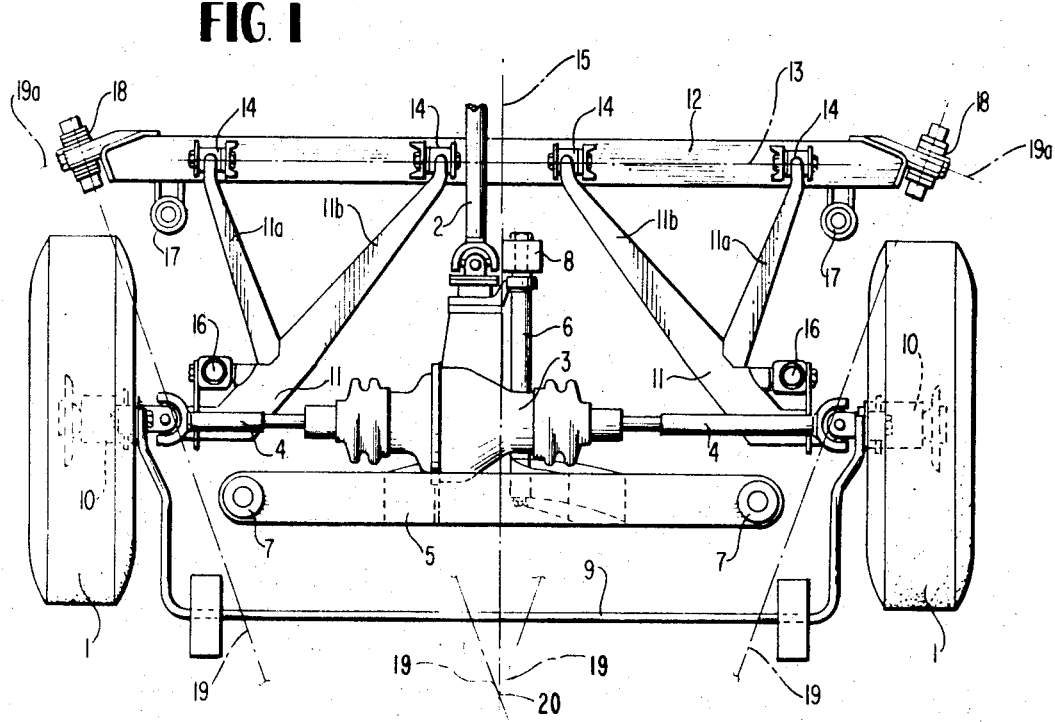

United States Patent [19]
Van Winsen et al.

[11] 3,727,713
[45] Apr. 17, 1973

[54] INDIVIDUAL WHEEL SUSPENSION AT INCLINED OR LONGITUDINAL GUIDE MEMBERS FOR MOTOR VEHICLES

[75] Inventors: Friedrich H. Van Winsen, Kirchheim/Tech; Friedrich Hoffman, Stuttgart-Bad, Cannstatt, both of Germany

[73] Assignee: Daimler-Benz Aktiengesellschaft, Stuttgart-Unterturkheim, Germany

[22] Filed: Aug. 15, 1969

[21] Appl. No.: 850,559

[30] Foreign Application Priority Data

Aug. 16, 1968 Germany................P 17 80 209.4

[52] U.S. Cl. ..............................................180/73 R
[51] Int. Cl..............................................B60g 11/00
[58] Field of Search ....................180/73, 73 C, 73 D; 280/124

[56] References Cited

UNITED STATES PATENTS 3,419,100  12/1968  Enke......................................180/73

3,557,896  1/1971  Mueller et al.......................180/73 R

FOREIGN PATENTS OR APPLICATIONS 1,387,075  12/1964  France..................................180/73

*Primary Examiner*—Kenneth H. Betts
*Attorney*—Craig and Antonelli

[57] ABSTRACT

An individual wheel suspension for the rear wheels of ttor vehicle in which the guide members, either inclined or longitudinal guide members, are pivotally connected at a common axle support which is connected wth the vehicle superstructure by way of elastic elements; the lines which extend through the elastic elements-disposed in front of the wheel axes-and which are perpendicular to the deflection directions of these elements, intersect in a point to the rear of the wheel axes that is disposed in a vertical plane containing the center longitudinal axis of the motor vehicle.

13 Claims, 2 Drawing Figures

INVENTORS
FRIEDRICH H. Van WINSEN
FRIEDRICH HOFFMANN

BY Craig, Antonelli, Stewart & Hill

ATTORNEYS

INDIVIDUAL WHEEL SUSPENSION AT INCLINED OR LONGITUDINAL GUIDE MEMBERS FOR MOTOR VEHICLES

The present invention relates to an individual wheel suspension at inclined or longitudinal guide members for the rear wheels of motor vehicles whereby the guide members are pivotally connected at a common axle carrier which is connected with the vehicle superstructure by way of elastic elements, especially made from rubber.

With the known wheel suspensions of the aforementioned type, the elastic elements serve exclusively for the weakening of shocks and impacts between axle carrier and vehicle superstructure as well as for the noise damping. However, it has not been achieved heretofore to impart to these wheel suspensions a certain inherent steering behavior or steering characteristic, the so-called understeering effect, which-as is known-increases in particular during curve drives of the vehicle the general stability thereof and improves the steering as well as the driving properties. Constructions are already known in the prior art in connection with the suspension of rigid and swinging half-axles which enable the understeering effect. In the former case, the rigid axle is guided in bushings whose axes are disposed in a horizontal plane and extend at such an inclination that they intersect a vertical plane containing the longitudinal center plane of the vehicle in points disposed in front of the center line of the wheel axis. With the swinging half-axles, the thrust guide members serving for the absorption of the thrust forces are so pivotally connected at the half-axle and at the vehicle superstructure that they are directed obliquely inwardly from in front to the rear.

The present invention aims at so constructing the individual wheel suspension at inclined or longitudinal guide members that the aforementioned inherent guide characteristic of the wheels is attained. The underlying problems are solved in accordance with the present invention in that the lines extending through the elastic elements disposed in front of the wheel axes which are perpendicular to the deflection directions of these elastic elements, intersect to the rear of the wheel axes at a point, the so-called instantaneous pole or center, which is located in the vertical plane containing the center longitudinal axis of the motor vehicle.

It is made possible by the construction according to the present invention of the individual wheel suspension that the axle carrier and therewith the wheels connected with the axle carrier pivot about the instantaneous pole in the event lateral forces act on the vehicle superstructure and on the wheels in opposite direction as, for example, during a curve drive of the vehicle. As a result thereof, the wheels are rotated relative to the vehicle superstructure toward the inside of the curve which initiates the understeering effect.

In an advantageous type of construction of the present invention, the elastic elements disposed in front of the wheel axes are arranged at the lateral ends of the axle carrier so that the forces introduced by the wheel suspension are supported on a very wide base.

A longitudinal springing of the wheels is made possible in a simple manner in that the elastic elements are constructed rotatable about the deflection direction as axis of rotation. As a result thereof, the axle carrier can carry out slight rotary movements about its center longitudinal axis. Since the linclined or longitudinal guide members are pivotally connected above or below the center longitudinal axis of the axle carrier at the latter, the rotary movement thereof means a movement of the inclined or longitudinal guide members and therewith of the wheels in the longitudinal direction of the vehicle.

It is possible to provide to the rear of the wheel axes a further elastic element between the axle carrier and the vehicle superstructure. This element is located in the instantaneous pole or center and is constructed laterally rigid in order not to impair the rotary movement of the axle carrier about the instantaneous pole, but is constructed yielding in the longitudinal direction in order to enable a longitudinal springing.

Accordingly, it is an object of the present invention to provide an individual wheel suspension for motor vehicles of the type described above which avoids by simple means the aforementioned shortcomings and drawbacks encountered in the prior art.

Another object of the present invention resides in an individual wheel suspension for the driven rear wheels of motor vehicles which enables by simple means an inherent understeering effect.

A further object of the present invention resides in an individual wheel suspension at inclined or longitudinal guide members for motor vehicles which not only permits an inherent understeering effect but also enables a longitudinal springing of the wheels.

Figure 2:
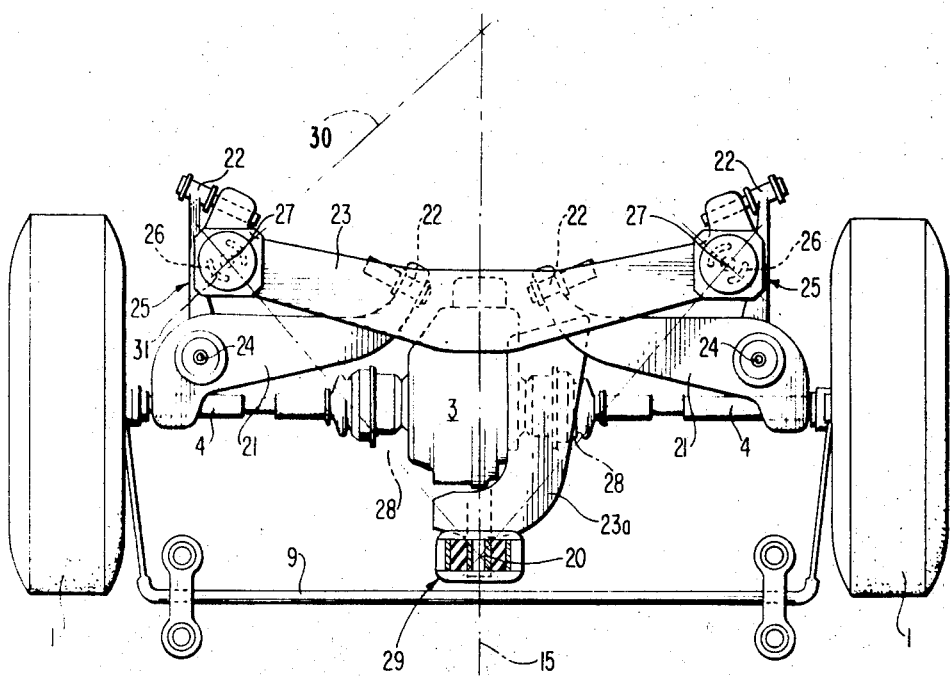

These and other objects, features and advantages of the present invention will become more obvious from the following description when taken in connection with the accompanying drawing which shows, for purposes of illustration only, two embodiments in accordance with the present invention, and wherein:

FIG. 1 is a plan view of an individual wheel suspension with a two-point support of the axle carrier and of the longitudinal guide members in accordance with the present invention; and FIG. 2 is a top plan view of a modified embodiment of an individual wheel suspension with a three-point support of the axle carrier and inclined guide members in accordance with the present invention.

Referring now to the drawing wherein like reference numerals are used throughout the two views to designate like parts, and more particularly to FIG. 1, the rear wheels 1 of this embodiment are driven by way of a cardan shaft 2, an axle gear supported in an axle gear housing 3 and two double-jointed half-shafts 4. The axle gear housing 3 is secured at the vehicle superstructure (not shown) by way of a strut or support 5, and by way of a thrust rod or stay 6 with the aid of rubber bearings 7 and 8 of conventional construction. As a result thereof, no axle guide forces act on the axle gear housing 3. Reference numeral 9 designates a torsion rod.

The wheels 1 are connected with the longitudinal guide members 11 by way of wheel bearings 10 and together with the same form a system rigid in a horizontal plane. The longitudinal guide members are each subdivided in the forward area thereof into two arms 11a and 11b which are rotatably connected with the axle carrier 12 but are non-displaceably connected with the axle carrier 12 in the direction of the axis of rotation 13 thereof which is located above the center longitudinal axis of the axle carrier 12 whereby the axis of rotation 13 common to the four pivot bearings 14 of the two longitudinal guide members 11 is disposed in a horizontal plane perpendicularly to the longitudinal axis 15 of the vehicle. The means 16 for the accommodation and mounting of coil springs (not shown) which are intended to support the vehicle superstructure are rigidly connected with the longitudinal guide members 11.

The axle carrier 12 which has essentially a box-shaped profile and whose length is approximately equal to the track width, is connected with the vehicle superstructure by way of rubber elements 17 and 18. The rubber elements 17 have a vertical or upright longitudinal axis so that they are constructed elastic or yielding in all directions in the horizontal plane whereas they are constructed relatively non-yielding or inelastic in the vertical direction. These rubber elements 17 are thus intended to transmit forces essentially only in the vertical direction and do not impair a relative movement between the axle carrier 12 and the vehicle superstructure in the horizontal plane. The rubber elements 18 are so arranged at the ends of the axle carrier 12 that the longitudinal axes 19 thereof extend at an acute angle to one another and intersect to the rear of the wheel axes in a point, the instantaneous pole or center 20, that is located vertically below the center longitudinal axis 15 of the vehicle whereby the rubber elements 18 are constructed yielding essentially only perpendicularly to the longitudinal axes 19 thereof. This construction and arrangement of the rubber elements 17 and 18 effects that an axle carrier 12 can carry out a pivot movement about the instantaneous pole or center 20 relative to the vehicle superstructure whereby the wheels 1 by reason of the horizontally rigid coupling thereof with the axle carrier 12 partake in these pivot movements and position themselves at an inclination relative to the vehicle superstructure. The inclined position of the wheels 1 is dependent on the force perpendicularly to the vehicle longitudinal axis 15 between vehicle superstructure and axle carrier resulting from the transverse acceleration of the vehicle superstructure as occurs in particular during curve drives of the vehicle so that the inclined position of the wheels 1 and therewith the understeering effect is always accurately determined.

The elastic elements 18 are so constructed that not only a deflection but also a rotary movement is made possible about the deflection direction 19a as axis of rotation. A longitudinal springing of the wheels 1 is made possible thereby because the axle carrier 12 can carry out a rotary movement about its center longitudinal axis whereby this rotary movement is transformed into a longitudinal movement of the longitudinal guide members 11 and therewith of the wheels 1 in the longitudinal direction of the vehicle. A precise wheel guidance is preserved during the longitudinal spring movements of the wheels 1.

The embodiment illustrated in FIG. 2 corresponds in relation to the drive mechanism of the wheels 1 by way of the axle gear 3 and the double-jointed half-shafts 4 essentially to the embodiment according to FIG. 1. The wheel guidance takes place by way of two inclined guide members 21 which are pivotally connected with an axle carrier 23 with the aid of pivot bearings 22. Means 24 for the mounting of coil springs are again provided on the inclined guide members 21.

The axle carrier 23 consists of a carrier extending essentially transversely to the vehicle longitudinal axis 15 as well as of an arm 23a rigidly connected therewith which extends up to the rear of the wheel axes. At the lateral ends of the carrier 23 are arranged between this carrier and the vehicle superstructure as elastic elements generally designated by reference numeral 25 two bearing supports essentially consisting of rubber, in each of which are provided two sickle-shaped apertures 26 concentric to the bearing axis 27. Whereas the connection between the carrier and the vehicle superstructure is essentially non-yielding in the vertical direction, the apertures 26 in contrast thereto enable in the horizontal plane a yielding in those directions which are determined by the connecting line 30 of the center points 31 of the two apertures 26 of each bearing support whereby these connecting lines intersect in front of the bearing supports in a vertical plane containing the vehicle longitudinal axis 15. The lines 28 perpendicular to these connecting lines which intersect the bearing axes 27 and are disposed in a horizontal plane, intersect each other to the rear of the wheel axes in a point, the instantaneous pole or center 20, that is located on the vertical plane containing the vehicle longitudinal axis 15. A further elastic element generally designated by reference numeral 29 is provided in the instantaneous pole or center 20 which connects the rear end of the arm 23a of the axle carrier 23 with the vehicle superstructure. The element 29 is constructed essentially non-yielding in the vehicle transverse direction in order to enable a pivoting of the axle carrier 23 and therewith of the wheels 1 about the instantaneous pole 20, whereas it is constructed yielding in the vehicle longitudinal direction in order not to impair a longitudinal springing. As a result of this three-point suspension of the axle carrier 23 at the vehicle superstructure, a support of the forces introduced by way of the wheel suspension is achieved which is further improved as compared to the embodiment of FIG. 1, whereas the movements of the axle carrier 23 and of the wheels 1 follow the same principle as in the embodiment according to FIG. 1 in dependence on transverse forces acting on the vehicle superstructure and the wheels 1.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are within the scope of those skilled in the art.

We claim:

1. An individual wheel suspension for rear wheels of a motor vehicle, comprising an axle gear housing having jointed half shaft axle means extending therefrom, common axle carrier means, guide means pivotally connected at the common axle carrier means and connected to the wheels driven by the half shaft axle means, first and second elastic means for connecting the common axle carrier means with the vehicle superstructure, characterized in that the first elastic means have predetermined deflection directions in a substantially horizontal plane, the first elastic means being substantially more resilient in the predetermined deflection directions than other directions in the horizontal plane, and lines which extend substantially perpendicularly to the deflection directions intersect to the rear of the wheel axes in a point that is located on a vertical plane substantially containing the center longitudinal axis of the motor vehicle, said axle carrier means including a rearwardly extending arm extending to the rear of the wheel axes, and the second elastic means connecting the rear portion of said arm to the vehicle superstructure.

2. An individual wheel suspension according to claim 1, characterized in that said guide means are inclined guide means.

3. An individual wheel suspension according to claim 1, characterized in that said first and second elastic means are made from rubber.

4. An individual wheel suspension according to claim 1, characterized in that the first elastic means are disposed in front of the wheel axes and are arranged at the lateral ends of the axle carrier means.

5. An individual wheel suspension according to claim 4, characterized in that the second elastic means is arranged within the area proximate to said point which is yielding in the longitudinal direction of the motor vehicle but is substantially non-yielding in the transverse direction.

6. An individual wheel suspension according to claim 1, characterized in that said axle carrier means extends substantially transversely to the vehicle longitudinal center plane and said first elastic means serve as bearing means to support the lateral ends of said carrier means at the vehicle superstructure in such a manner as to provide maximum yieldingness in a direction substantially perpendicular to said lines.

7. An individual wheel suspension according to claim 6, characterized in that the first elastic means are provided with recess means whose center points define lines substantially perpendicular to said first-mentioned lines.

8. An individual wheel suspension according to claim 7, characterized in that said point is located within the area of said second elastic means.

9. An individual wheel suspension according to claim 8, characterized in that said wheel guide means are inclined guide members having pivot axes at the carrier means, the axes extending at an angle inwardly from the front to the rear.

10. An individual wheel suspension according to claim 1, characterized in that the second elastic means is arranged within the area of said point which is yielding in the longitudinal direction of the motor vehicle but is substantially non-yielding in the transverse direction.

11. An individual wheel suspension according to claim 1, characterized in that said carrier means extends substantially transversely to the vehicle longitudinal axis, said guide means being pivotally connected at said axle carrier means, wheel carrier means and a respective guide means being substantially rigid with the corresponding wheel carrier means in a substantially horizontal plane.

12. An individual wheel suspension according to claim 1, characterized in that said axle carrier means extends substantially transversely to the vehicle longitudinal center plane and is provided with said first elastic means serving as bearing means to support the lateral ends of said carrier means at the vehicle superstructure in such a manner as to provide maximum yieldingness in a direction substantially perpendicular to said lines.

13. An individual wheel suspension according to claim 12, characterized in that said first elastic means are provided with recess means whose center points define lines substantially perpendicular to said first-mentioned lines.

* * * * *